(12) United States Patent
Clarke

(10) Patent No.: US 6,348,102 B2
(45) Date of Patent: Feb. 19, 2002

(54) APPARATUS AND METHOD FOR REMOVING AND PREVENTING DEPOSITS

(75) Inventor: David George Clarke, Houston, TX (US)

(73) Assignee: BP Exploration and Oil, Inc., Chicago, IL (US)

( * ) Notice: Subject to any disclaimer, the term of this patent is extended or adjusted under 35 U.S.C. 154(b) by 0 days.

(21) Appl. No.: 09/732,784

(22) Filed: Mar. 12, 2001

Related U.S. Application Data

(63) Continuation of application No. PCT/GB99/01930, filed on Jun. 17, 1999.
(60) Provisional application No. 60/090,157, filed on Jun. 22, 1998.

(51) Int. Cl.[7] .............................. B08B 3/04; B08B 9/02; B08B 9/027
(52) U.S. Cl. ..................... 134/5; 134/19; 134/22.11; 134/105; 134/166 C
(58) Field of Search ............................. 134/5, 19, 22.11, 134/105, 107, 166 C; 138/38

(56) References Cited

U.S. PATENT DOCUMENTS

| 4,755,230 A | 7/1988 | Ashton et al. |
| 5,639,313 A | 6/1997 | Khalil |
| 5,641,022 A | 6/1997 | King |

OTHER PUBLICATIONS

"Model calculates wax deposition for N. Sea oil;s," Oil & Gas Journal, vol. 88, No. 25, pp. 63–68 (1990).

*Primary Examiner*—Zeinab El-Arini
(74) *Attorney, Agent, or Firm*—Nixon & Vanderhye

(57) ABSTRACT

Apparatus including an elongate pipe (1) for use in the transfer of fluids susceptible to form deposits on cooling such as wax deposits in oil, and a container (12) having a reusable heat source including a supercooled solution, e.g., of aqueous sodium acetate. The container (12) is in heat conducting contact with a surface of the pipe (1), preferably on at least one surface of the container. The deposit may be removed from inside the pipe (1) by locating in heat conducting relation to the pipe a reusable heat source including a supercooled solution, and activating crystallization in the solution liberating heat which causes at least some of the deposit to melt and/or dissolve.

30 Claims, 3 Drawing Sheets

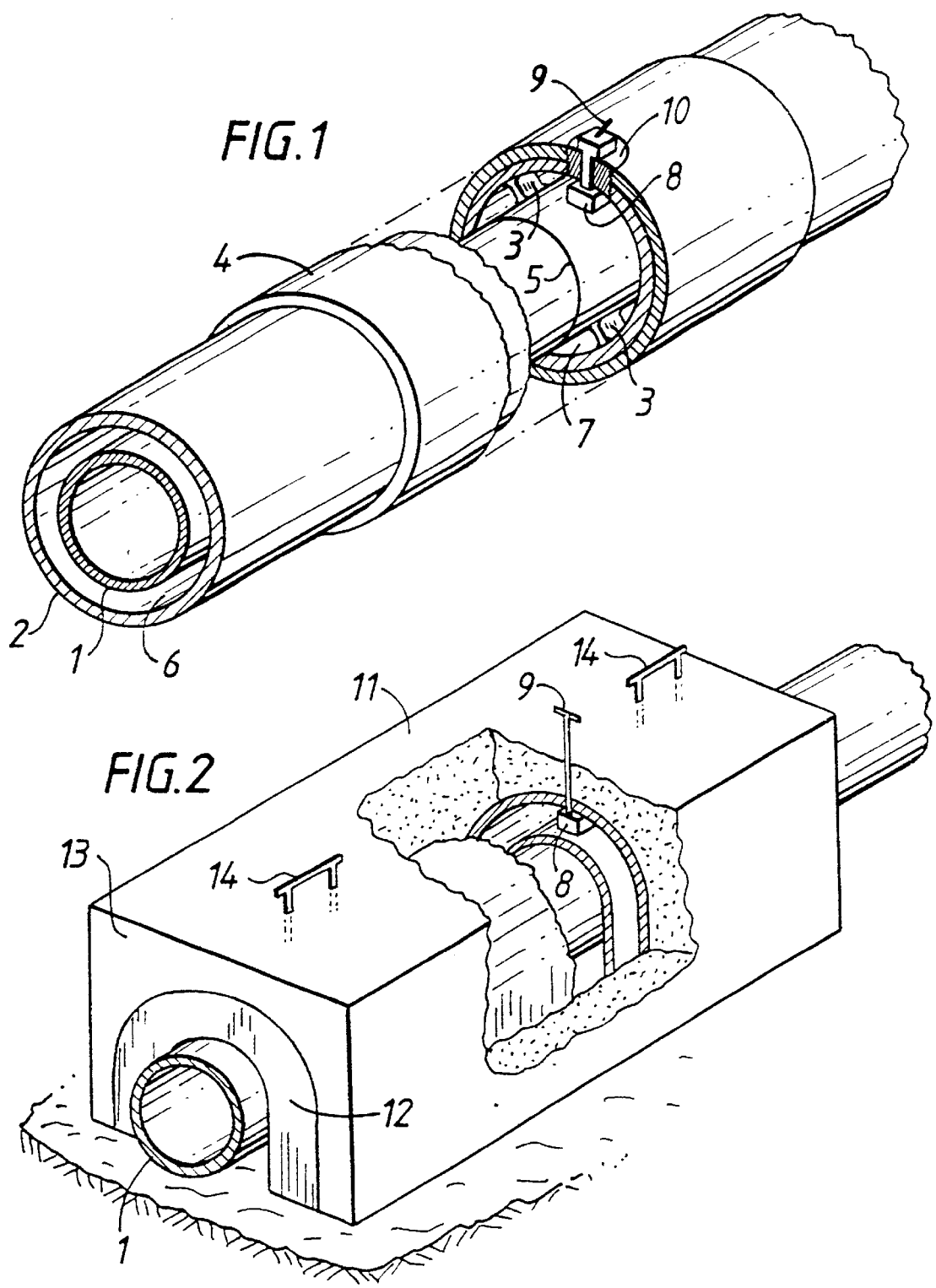

SECTION A-A

APPARATUS AND METHOD FOR REMOVING AND PREVENTING DEPOSITS

This is a continuation of PCT application No. PCT/GB99/01930, filed Jun. 17, 1999, the entire content of which is hereby incorporated by reference in this application which claims the benefit of U.S. Provisional application No. 60/090,157, filed Jun. 22, 1998, the entire content of which is hereby incorporated by reference in this application.

BACKGROUND OF THE INVENTION

This invention relates to the removal of deposits, in particular in pipelines, and to apparatus for that removal.

Pipelines for liquids, especially crude oil or wet gases such as natural gas, often pass through cold areas, either on the surface in Arctic areas or on the sea bed e.g. in North Sea or Gulf of Mexico. These cold conditions can result in formations of deposits of wax from the oil or gas hydrate crystals from the natural gas, the deposits forming when fluid flow is stopped e.g. during shut down or in extreme cases when fluid is still flowing. The deposits reduce the flow rate and ultimately if they build up sufficiently can block the line. Existing methods of removing the deposits are mechanical using "pigs" to scrape out the wax, physical, such as use of hot oil flushes, or chemical such as addition of alcohols and/or chemical deposition inhibitors. None of these is completely satisfactory.

SUMMARY OF THE INVENTION

A method and apparatus has now been devised to remove the deposit in a different way, namely by localized heating of the pipe (and hence its elements) using a reusable heat source.

The present invention provides an apparatus comprising an elongate pipe for use in the transfer of fluids susceptible to form deposits on cooling, and a container comprising a reusable heat source comprising a supercooled solution, said container being in heat conducting contact with a surface of said pipe, preferably on at least one surface of said container.

The present invention also provides a method of removing from inside a pipe a deposit formed on cooling a fluid passing through said pipe, said method comprising locating in heat conducting relation to said pipe a reusable heat source comprising a supercooled solution, and activating crystallization in said solution liberating heat which causes at least some of the deposit to melt and/or dissolve. The method preferably comprises subsequently passing fluid through said pipe to cause the crystals in said heat source to form into a solution, followed by allowing the solution to cool to reform the supercooled solution.

The present invention also provides a container for a reusable heat source, said container having at least one surface adapted to be capable of being in heat conducting relation to a pipe.

The pipe may be for transfer of crude oil with or without gas and/or water, or transfer of wet gas. The pipe may be on land e.g. Arctic tundra or underwater e.g. on the sea bed, or may be involved in production rather than transport of the oil/gas e.g. the production annulus in a well bore. The pipe is usually metallic e.g. of ferrous metal such as steel, but may be of other heat conducting material e.g. fibre reinforced polymer, such as carbon fibre reinforced material. The pipe is usually at least 8 cm in diameter, such as 8–80 in particular at least 10 cm, such as 25–50 cm.

The container for the heat source is usually an elongate body of which an elongate surface is in contact with the pipe. That section of pipe may be one with or preferably without joints, though the pipe may have one or more bends, especially shallow bends. Particular shaped containers are preferred for a pipe with sharp bends e.g. one of 45–145° such as right angled ones, those containers preferably conforming to one or more parts of the bend. The container inner surface usually has a concave shape adapted to receive the pipe. The container surface may contact the pipe circumference over only a part of the total circumference of the pipe such as at least 15% e.g. when only one wall of the pipe is in contact with a source of cold e.g. sea, so deposits only form on that wall. There may be more than one of such containers, each contacting past of the pipe circumference at that location, the totality of said surfaces of the containers surrounding the pipe circumference. Thus there may be 2–4 elongated containers, each with an inner concave surface adapted to receive a part of the pipe circumference; in this case the 2–4 containers fit in sections around the pipe. These sections may be removably or non removably attached to the pipes. Thus they may be strapped to the pipe and/or to each other e.g. with a clamping strip with means to locate and receive that strip on the outsides of the containers, but preferably the sections have reversibly releasable means to attach the sections to each other, e.g. with appropriate clips and corresponding latches to enable the sections in total to fit round the pipe.

The part section elongate containers with the inner concave surface may also adapted to be fitted over the pipe, in particular when the pipe is laying on the ground or on a partly immersed in a sea bed, rather than round the pipe. In this aspect of the invention the containers may be in the form of part annular elongate caps or covers e.g. of arch or horseshoe shaped cross section and in particular with a top hemispherical inner surface for receiving and fitting over the pipe; the heat source would then be located in the annulus and the container could conveniently for ease of handling be fitted with one or more means for suspension e.g. hooks on its top outer curved surface.

The container may contact the pipe around its entire circumference i.e. surround the pipe, and in this case the container is in the form of an annulus surrounding the pipe. The shape of the outer transverse surface of the pipe may be the same or different from that of the external shape of the container, conveniently the container and pipe are coaxial, especially with spacers between them to maintain a substantially constant separation between the container outer wall and the pipe. When the container surrounds the pipe the container may be removable from the pipe, but it is preferably not so removable. The annular container may have an inner surface for contacting the pipe, e.g. be in the form of a sleeve or sheath, and in this form may be removable. The outer surface of the container may be arcuate e.g. cylindrical or may be rectangular e.g. square. In a modification the heat source in the annulus is in direct contact with the exterior wall of the pipe so the inner surface of the container is the outer surface of the pipe; the container and pipe then become a double walled container e.g. double walled pipe.

Advantageously the container has heat insulation on at least one and preferably substantially all of its sides not to be in contact with the pipe. The insulation may be on the inside of the outer wall of the container but is preferably on its outer wall. The insulation may be inorganic e.g. fibrous as in rock wool or particulate as in fly ash powder, aluminium silicate microspheres or expanded vermiculite, or pumice or glass wool or organic as in foamed polymer or with larger voids as in laminated sheets enclosing separate gas bubbles e.g. "bubble wrap". Preferably the container and pipe are such that in use the external surfaces of the container are heat insulated from the environment e.g. the sea. Advantageously on the inside of the outer wall of the container are one or more reflective surfaces to focus the heat back towards the pipe.

The container which is usually rigid and of metal has within it the supercooled solution, which may be in contact with the walls of the container, or retained inside one or more bags constructed preferably of flexible impermeable plastics material, e.g. fibre reinforced rubber, PVC or nylon.

The container itself may also be in the form of an elongated flexible body capable of being wrapped around the pipe e.g. helically in one or more strips, preferably substantially to cover the pipe's outer circumference or lain e.g. axially over the length of the pipe or transversely across the pipe. Accordingly an apparatus may be provided which comprises a container extending around the pipe. The body may contain the solution with free fluid movement throughout, but the body such be divided with more than one section restricting or inhibiting such movement; the subdivision may be by bringing opposing sides of the elongate body towards or into contact along preplanned lines e.g. to create square, rectangular or diamond shaped products in the manner of a quilt. When the container is a flexible body, it has at least one heat conducting wall for interaction with the pipe e.g. a flexible metal wall such as a metal sheet or foil such as of steel or aluminium; the remaining walls of the body may be of non metallic material such as that mentioned above for the bags, preferably rubberized fabric. The flexible metal wall may have sufficiently bending modulus to allow it to be clipped over the pipe and be retained in place in the pipe.

The flexible body may be stored in a roll, transported to the pipe and then laid on or wrapped round the pipe.

If desired the container may have a rigid framework whether in transverse or axial sections or otherwise, which is adapted to engage or receive the pipe, and the framework defines one or more pockets into which or each of which the heat source in a flexible or rigid container may be placed.

The framework is usually open and is elongate of part annular cross section; it may have a number of pairs of opposed inner and outer circumferential bars, the inner one preferably adapted to receive the pipe, and a number of pairs of inner and outer axial bars, whose axes are generally parallel to the pipe axis. The framework may be mounted permanently or semi permanently on the pipe, and hence may be removable from the pipe but is usually not removable. The annular section framework defines one or more pockets adapted to receive one or more removable heat sources in separate containers, each of which may itself be in the form of an elongate body of annular cross section and whose inner arcuate surface is adapted to fit in thermal contact with the outer surface of the pipe. The removable container may be received or placed in the framework and retained therein e.g. by retaining means, such as an axial or circumferential retaining bar on the outside or may be slotted into the framework from the top, or the framework may be hinged e.g. on the bottom of the inner, or outer, lower axial bars, so it, or just the outer bars, may be capable of opening outwards, so the removable container may be inserted and then the outer bars moved to restrain the removable container e.g. by latching the outer bars onto the inner ones. Alternatively the pockets may be in a position to locate the removable container therein, but with restraining means to stop the separation of framework and the removable container. The restraining means may be at least one bar, hingeable to an outer bar and capable of being of being latched to another outer bar, e.g. between upper and lower axial bars or a pair of outer circumferential bars. By this means the framework may be retained on/around the pipe on the sea bed, while the heat source may be placed into it for periods when solids deposition is likely. Such an approach reduces the time spent by the heat source in situ when it is not needed.

The framework may also be a flexible one, provided with pockets into which the heat source container may be placed.

Usually the container comprises only one kind of supercooled solution, giving a certain amount of heat on crystallization. If desired the container may contain 2 or more separate volumes, each capable of giving different amounts of heat. Thus the container may contain an inner sheath and an outer sheath, the inner sheath for contact with the pipe, directly or indirectly via the container wall, and the outer sheath spaced from the pipe by the inner sheath. The amount of heat from the inner sheath is different from that from the outer sheath, in particular being less than the latter.

Removable containers tend to be easier to fit, and can be retrofitted and may be removed e.g. by remote-operated vehicles (ROV)or cranes for recharging away from the pipe. Non removable containers require no maintenance and are simpler, but cannot be retrofitted.

The reusable heat source comprises a supercooled solution, which is supersaturated, so that on activation, it crystallizes liberating heat forming crystals, which are melted or dissolved later in the recharge step. Thus the solution contains one or more compounds usually salts, which have high heats of crystallization (and in particular form hydrated crystalline salts), form aqueous solutions of at least 30% w/w concentration and form supercooled solutions at the temperature of use of the apparatus of the invention e.g. −10 to +20° C.; the solutions are also preferably ones both substantially free of crystals and incompletely saturated at the temperature of hot crude oil e.g. 100° C. Preferably the compound is a hydrated salt which dissolves in its own water of crystallisation. The cloud point of the solution is preferably 50–90° e.g. 60–80° C. The salts are usually nitrates or acetates, e.g. alkali or alkaline earth metals or ammonium, preferably calcium nitrate tetrahydrate, and especially sodium acetate. The amount of heat liberated (and hence the maximum temperature the pipe (and contents) can reach) depends on the concentration of the compound in the water and the temperature to which the supercooled solution is cooled by the fluid in the pipe, as these govern the weight of crystals formed. The rate of crystallization can also be changed depending on the degree of supercooling, the higher the degree the faster the heat evolution. In this way use of different concentrations of the same compound or use of different compounds can give different degrees of heating, and hence the option of 2 or more stage heaters as described above. The heat source solutions in their supercooled form are substantially free of crystals of the salt, and also preferably substantially free of possibly contaminating or seeding materials such as loose solid particles or flakes e.g. of scale or corrosion products. The heat source solution is then preferably sealed in a corrosion proof environment e.g. a bag as described above.

The apparatus of the invention also comprises an activator for the crystallization, the activator being in physical contact with the supercooled solution. The activator comprises means for producing a seed crystal, either directly or indirectly by creating a surface on which seed crystals will grow. Thus one or more seed crystals may be introduced into the solution. Preferably the container comprises means for creating fresh solid surfaces, whether in the form of particles or on massive bodies. Thus creation of metal particles in the solution, by attrition/abrasion, or of fresh surfaces e.g. of metal, stone, ceramic or glass may be used. The creation may result from relative movement of 2 separate bodies bearing on one another, e.g. metal on metal, or stone on ceramic (or the reverse) such as scratching the walls of a metal container with a metal rod, but preferably the creation comes from relative movement of different parts of the same body e.g. opposing sides of fissures or cracks in a metal film or disc. The fissures or cracks may start at the perimeter or edge of the film or disc, and penetrate inside, or may be wholly internal, in particular in the form of substantially linear cracks or fissures, or especially ones with a substantially linear portion and a further portion or portions at the end (or ends) of the linear portion, but at a sharp angle thereto in particular creating a disconformity; examples of these fissures are I or T shaped ones. Instead of the sides of the fissure or crack contacting one another to create the surface or particles, the crack or fissure may be extended in activation to create the fresh surface. Most preferably the activator is a film or disc e.g. of metal having on the surface thereof loosely adhered or embedded nodules or particles, such as are formed by embedding in the film or disc particulate material of higher hardness than that of the film or disc, e.g. alumina or carborundum.

The fresh surface or particles may be formed by relative movement of the 2 parts of the activator, or of 2 sides of fissures or cracks of the same part, the latter being achievable by flexure of the body of the activator e.g. by bending of the metal film. The metal film may be fixed at one end in the container, e.g. to its wall and free at the other end, or may be fixed at both ends but flexible in between or fixed in a rigid rim of a disc, with the disc being mounted in the rim, either coplanar with it or dished or bowed with respect to it. Bending or flexing of the film or disc creates the fresh surfaces. The creation may be a single occurrence e.g. when a strip is bent once, or a repeating occurrence e.g. with a vibrating metal diaphragm. The fresh surfaces may also be created in a rod shaped body, rather than a film, the body having fissures or cracks in its outer surface; it too may be in a linear or bent form in its resting state, and cracks may be formed by bending it, or in the case of a bent form rod axially rotating it.

The means for inducing crystallisation may also be a means for inducing shear in the heat source fluid, the shear creating the crystals. The shear may be induced by mechanical movement acting on the heat source fluid e.g. by longitudinal or radial movement. Thus the shear inducing means may be a piston moving in a chamber open to the fluid or, a plunger moving in a syringe of the fluid; the movement may be caused electrically, hydraulically or electrohydraulically. Advantageously the longitudinal shearing means are provided with a return means, so that the moving pat, piston or plunger is urged back to its initial position from the position achieved as a result of the movement causing shearing; thus the piston may move in 1 or more steps from an initial position to a final position which may be held during crystallisation and then on recharging the heat source after use the piston is urged back. The return means may be a compression spring. If desired the return may happen after each movement e.g. after crystallisation and recharging or preferably before or during crystallisation. Thus a rapid depression of a piston creates shear and hence crystallisation and the piston rapidly returns. In a modification the longitudinally induced shear device may comprise a piston or plunger urged to move in both directions in a cylinder, with means to reverse the traverse at the end of the piston movement.

Another method of inducing shear involves a rotary movement, e.g. of a propeller or stirrer, such as one driven electrically, hydraulically or electrohydraulically. The rotary movement of the propeller creates the shear and hence the crystals. No mechanism for reversing the traverse or returning a piston is needed.

There is usually at least one activator per volume of supercooled solution in which there is the capacity for free liquid movement or free contact of solid crystals and supercooled solution. Thus in a non subdivided container one or more activators may be used, while in a completely subdivided container, there is at least one activator per subdivision. Elongate containers may have activators spaced along them to maximize heat output from identical crystallization times.

The activator is triggered at an appropriate time. That time may be before solid deposition i.e. for prophylactic purposes when deposition in the pipe is expected, or after deposition i.e. for remedial purposes. The trigger for the activator may be automatic or externally controlled. Examples of automatic triggers are ones that induce activation when the temperature of the fluid in the pipe reaches down to a desired level; in this case there may be a thermocouple or other temperature transducer in thermal contact with the external surface of the pipe, which registers when the temperature of the pipe has dropped to a preset level, e.g. one when deposition of solids is likely to be about to happen or to have happened. The automatic trigger may also be derived from a pressure transducer, which registers a pressure drop in the pipe, because solids deposition increases the pressure drop; the pressure transducers are usually in the fluid in the pipe. Automatic triggers can pass signals to the activators by electromagnetic radiation.

Advantageously the activation is triggered externally either locally of the container or remote therefrom. Examples of local triggers are external mechanical movements outside the container which interact and engage mechanical movements of the activator inside the container e.g. movements of arms or magnets outside to result in bearing of 2 surfaces upon one another inducing the crystallization or flexing or bending of a fissured film, disc or rod. The trigger may be operated by diver or ROV or wire line. Preferably the trigger is remote by a wire-less signal e.g. from the water surface, such as by radio, sound, magnetic or laser signal causing the activator to move e.g. film to flex or disc to flex e.g. vibrate or rod to rotate. The signal may cause a magnetic field to be generated resulting in change of the shape of the metal film creating fresh surfaces, the cessation of the signal resulting in the film shape returning to the previous shape either immediately (i.e. before crystallization) or later (after the crystals have been remelted or redissolved).

When the activation occurs, the crystals form in the supersaturated solution and heat is liberated, warming the elements of the pipe, thereby dissolving the solid e.g. wax in the fluid or melting it. The fluid may be flowing at this time or stationary, but if the latter, then preferably only one stage of a multistage heat activation is used, activation of the other stages being induced at later dates to inhibit or stop reformation of solids, Such multistep activation can be controlled for example by use of different frequencies for the trigger or different mechanical arms for different locations of heat source activation. Once the solid in the pipe has melted or dissolved, the fluid flow rate can return to normal. Removal of solid from the wall of the pipe may result in production of a loose solid body in the fluid in the pipe which may be carried away by the flow and preferably transported to a location in the pipe at a higher temperature. Thus it may only be necessary to melt/dissolve some of the wax to increase the flow to some extent or substantially completely back to normal. Preferably without significant delay after the fluid flow rate has returned to normal the temperature and/or the flow rate of the fluid is maintained at a higher level in order to heat the heat source, resulting in re-melting of the crystals or their re-solution to form a solution in the heat source, the heating being continued for a period of time and temperature such that the solution produced contains no crystals. Thereafter the fluid flow rate may be maintained at the desired rate with the heat source solution recharged. When the pipe contents cool down again, so will the heat source solution, which will reform the supersaturated solution, ready for reuse when crystallization is activated.

Thus in use, the fluid flows in the pipe and, when the contents in the pipe (or any section of it) become too cold so there is actual or incipient deposition of solids, e.g. during a shut down, or extreme temperature conditions giving long term slow deposition (especially with wax), then the trigger is activated, crystallization happens, heat is liberated, and at least some of the pipe solids are dissolved or melted. Subsequently when fluid flow returns to usual, hot fluid e.g. crude oil in a slug or otherwise is passed down the pipe to recharge the heat source.

The above approach is preferred for non removable heat sources, but removable ones may be separated from the pipe and heated remote from the pipe to recharge them. Thus they may be removed from the pipe, brought to the surface, recharged and returned into place. Alternatively by ROV they may be removed sequentially, passed through a heated enclosure underwater to recharge them and returned to contact the pipe.

The controller of the fluid flow may be informed of the discharge of the heat source by measurement of the properties of the solution in the heat source e.g. its viscosity, conductivity or velocity of sound in it.

BRIEF DESCRIPTION OF THE DRAWINGS

The invention is illustrated in the accompanying Figures in which FIGS. 1–3 are schematic drawings of apparatus of the invention, depicting pipe lengths.

DETAILED DESCRIPTION OF PREFERRED EMBODIMENTS

Figure 3:
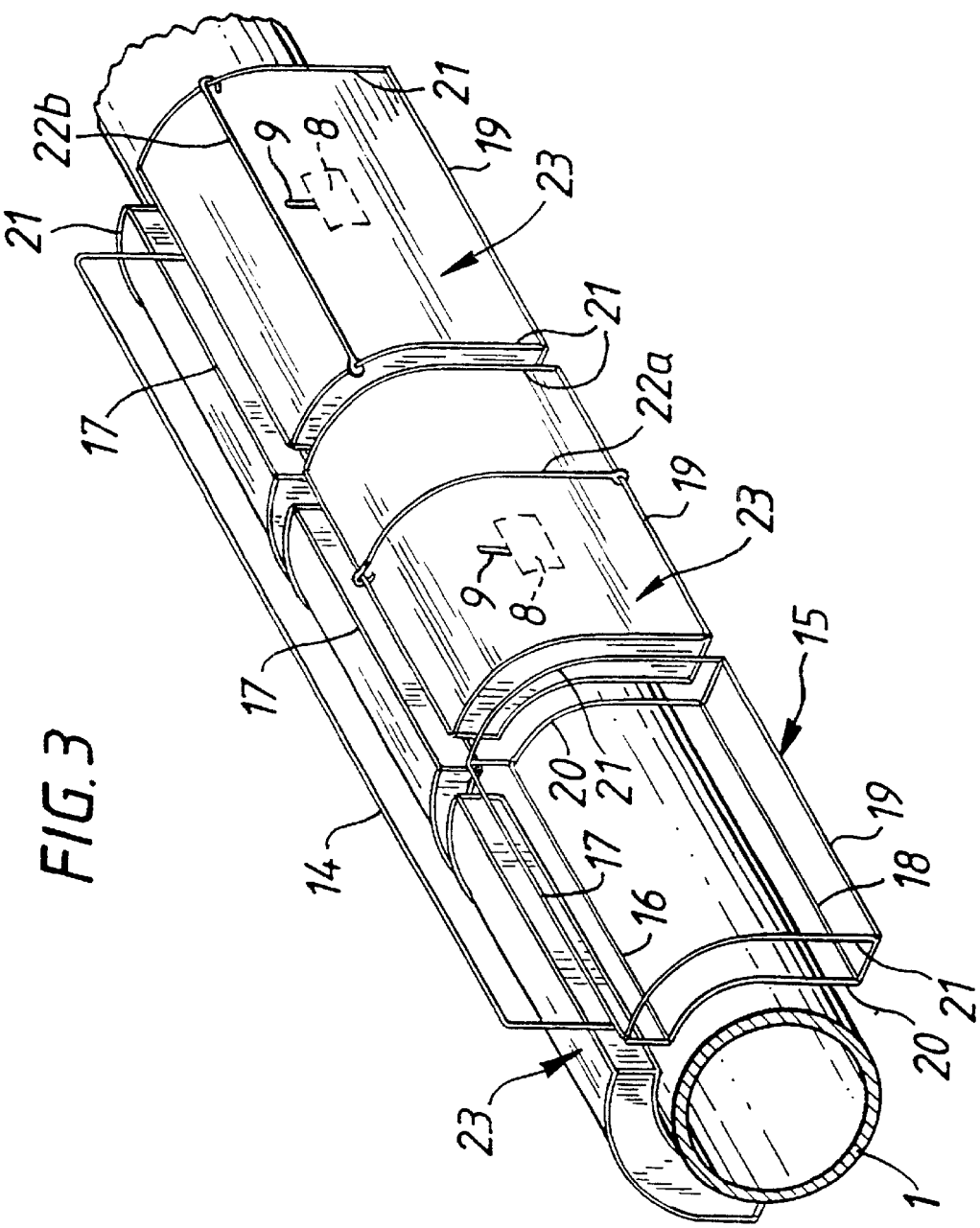

Preferring now to FIG. 1, a flow pipe 1 is concentrically surrounded by a container wall 2 and spaced therefrom by a series of spacers 3 (one shown for convenience) in an annulus 6. Lengths of pipe 1 are joined together e.g. by welding, and lengths of container wall 2 are joined together by a sleeve 4 surrounding a weld joint 5, the sleeve 4 forming the outer wall in this location and forming an annulus 7 with the pipe 1 there. In annulus 7 is located an activator 8, shown schematically which, is connected to outside sleeve 4 by connector 9, also shown schematically. In use, annuli 6 and 7 containing the supercooled solution preferably sodium acetate solution while pipe 1 contains the fluid being transported e.g. crude oil or wet gas.

The device can be constructed by welding bulk heads 3 or spacers between concentric sections of pipe 1 and wall 2. One length of pipe 1 is then welded to the next length with a joint 5. Next section of wall 2 and concentric sleeve 4 are sequentially fitted over the new length of pipe 1 and welded thereto, the sleeve also being welded to the old wall 2. The activator 8 is then located in the annulus 7, being inserted through sleeve wall, e.g. via a sealable port 10. This process is then repeated for all the lengths of pipe 1 needing protection. If desired a layer of insulation not shown may be located outside the wall 2.

In use the salt solution either already super cooled or preferably above its saturation temperature is passed through annuli 6 and 7 until the desired lengths of annuli are full; each length may be isolated from the next, in which case each has to be filled separately. The fluid is passed through the pipe 1, and when the flow stops, e.g. because of an emergency or other well shut down, the fluid tends to cool down, because of thermal contact with the environment, solids tend to deposit in pipe 1 and/or a super cooled solution forms in annulus 6 (if it has not formed at a higher temperature). When the flow is about to be restarted, the activator 8 is activated e.g. with manual or other operation of a ROV acting on connector 9 or an electromagnetic signal e.g. from the water surface. The super cooled solution crystallises liberating heat melting or dissolving the deposited solids, so the fluid can flow again. Passage of the hot fluid may then be sufficient to cause the crystals to dissolve, or otherwise a special flow of extra hot fluid can be passed in the pipe 1 to achieve this. The solution is then reready for reuse.

FIG. 2 shows a different arrangement in which the container of solution is removable from pipe 1. In this case a cover 11 surrounds the top and sides of the pipe 1, which maybe e.g. lying on a sea bed or land. Cover 11 comprises a curved e.g. arcuate elongate container 12 of generally hemispherical cross section surrounded by an insulated jacket 13. In container 12 is located on activator 8 which is joined to connector 9, which may be a T shaped tap. On top of cover 11 are handles, or hooks 14, for use in transporting the cover 11. The cover 11 is used in the same manner as the apparatus of FIG. 1, but is moveable to the site of its use to cover pipe 1, and can be removed afterwards for regeneration.

FIG. 3 shows a modification of the apparatus of FIG. 2 in which there is an open framework 15 having inner and outer upper axial bars 16 and 17, inner and outer lower axial bars 18 and 19, and inner and outer circumferential bars 20 and 21. The framework also has a restraining bar 22a (or b) hingeably mounted on one bar 19 (or 21) and releasably latchable onto corresponding bar 17 (or 21). The bars 16, 17, 18, 19, 20 and 21 define a pocket in which is located a modular container 23 of the heat source solution, as well as activator 8 and connector 9; modular container 23 may have flexible or rigid walls, but has an inner surface adapted to be in thermal contact with pipe 1.

FIG. 3 has a first pocket empty showing the surface of the pipe 1, and second and third pockets each having a removable container 23 of the heat source shown therein, the container being retained from separation from framework 15 by bar 22a or bar 22b respectively. The pocket may enclose its container(s) 23 at the time of covering pipe 1 with the framework, or the containers 23 may be inserted later; in the latter case, the framework 15 may if desired be located permanently on the pipe 1, the containers 23 being inserted as and when required and removed individually after reuse for regeneration.

Figure 4:
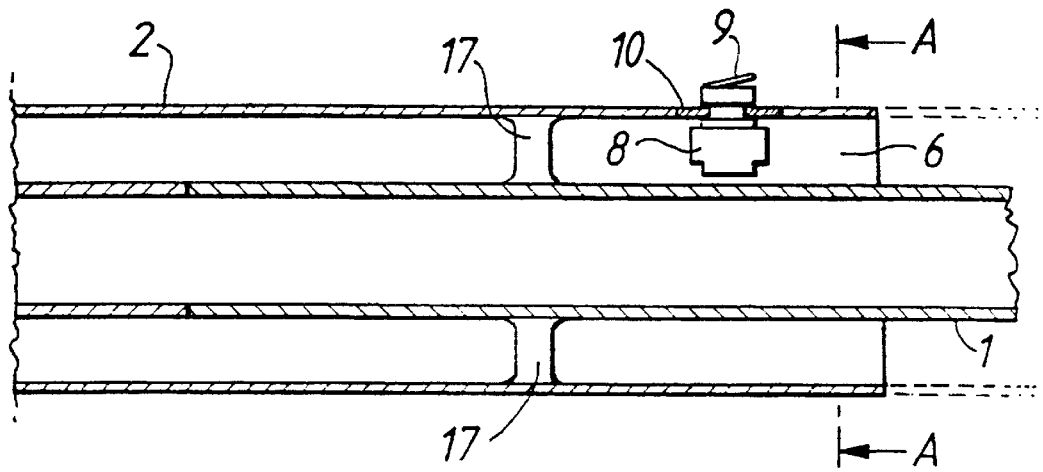
FIGS. 4 and 5 are longitudinal and transverse sections through the apparatus.
Figure 5:
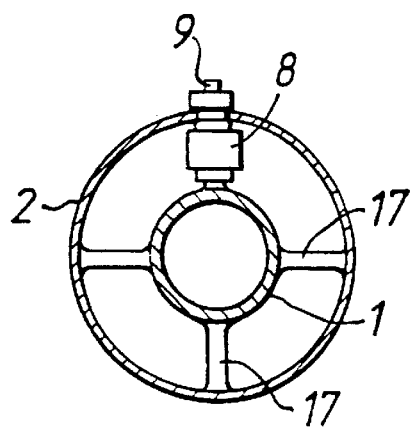

FIG. 4 shows a longitudinal section through an apparatus similar to that shown in FIG. 1. Flow pipe is coaxially surrounded by container wall pipe 2, and separated therefrom by annulus 6 in which is located activator 8, set in slot 10 with connector 9 projecting from wall 2. A bulk head 17 joins pipe 1 to pipe 2. Section AA shows an end view of the pipe with a multi phase mixture of oil and water and/or gas inside pipe 1.

I claim:

1. An apparatus comprising an elongate pipe for use in the transfer of fluids susceptible to form deposits on cooling, and a container comprising a reusable heat source comprising a supercooled solution, said container being in heat conducting contact with a surface of said pipe.

2. An apparatus according to claim 1 wherein the pipe is metallic.

3. An apparatus according to claim 1 wherein the container for the reusable heat source is an elongate body of which an elongate surface is in contact with the pipe.

4. An apparatus according to claim 3 wherein the elongate surface contacts at least 15% of the pipe circumference.

5. An apparatus according to claim 3 wherein the elongate surface has a concave shape adapted to receive the pipe.

6. An apparatus according to claim 5 further comprising 2–4 containers each with an elongate concave shape surface which fits in sections around the pipe.

7. An apparatus according to claim 6 wherein the sections have reversibly releasable means for attachment to each other.

8. An apparatus according to claim 6, wherein the sections are removably attached to the pipe.

9. An apparatus according to claim 8 wherein the container is fitted with one or more means for suspension.

10. An apparatus according to claim 1 wherein the container has a rigid framework which is adapted to engage or receive the pipe, and the framework defines one or more pockets in which the heat source in thermal contact with the pipe is present in said container which is flexible or rigid.

11. An apparatus according to claim 1 wherein the container is an elongated flexible body extending around the pipe.

12. An apparatus according to claim 1 wherein the container has heat insulation on at least one of its sides not in contact with the pipe.

13. An apparatus according to claim 1 wherein the container is metallic.

14. An apparatus according to claim 1 wherein the supercooled solution is retained inside the container in at least one bag constructed from a flexible impermeable plastic material.

15. An apparatus according to claim 1 wherein the supercooled solution contains at least one salt that can form an aqueous solution of at least 30% by weight concentration at a temperature of between −10 to +20° C.

16. An apparatus according to claim 15 wherein the salt is a nitrate or an acetate salt.

17. An apparatus according to claim 16 wherein the salt is calcium nitrate tetrahydrate or sodium acetate.

18. An apparatus according to claim 15 wherein the salt is an alkali metal, alkaline earth metal or an ammonium salt.

19. An apparatus according to claim 1 further comprising an activator for crystallization of said supercooled solution wherein the activator is in physical contact with the supercooled solution.

20. An apparatus according to claim 19 wherein the activator produces a seed crystal.

21. An apparatus according to claim 19 wherein the activator comprises means for creating fresh solid surfaces.

22. An apparatus according to claim 19 wherein the activator comprises means for creating fissures or cracks in a metal film or disc.

23. An apparatus according to claim 19 wherein the activator is a metallic film or disc having on the surface thereof loosely adhered or embedded nodules or particles of higher hardness than that of the film or disc.

24. An apparatus according to claim 19 wherein the activator comprises a longitudinal shearing means with a return means.

25. An apparatus according to claim 19 wherein the activator is triggered by a remote wire-less signal.

26. An apparatus according to claim 1 wherein the fluid is crude oil with or without gas and/or water.

27. A container as defined in claim 1 wherein said container has at least one surface in heat conducting relation to the pipe.

28. A method of removing from inside a pipe a deposit formed on cooling a fluid passing through said pipe, said method comprising locating in heat conducting relation to said pipe a reusable heat source comprising a supercooled solution, and activating crystallization in said solution to liberate heat which causes at least some of the deposit to melt and/or dissolve.

29. A method according to claim 28 comprising subsequently passing fluid through said pipe to cause the crystals in said heat source to form into a solution, followed by allowing the solution to cool to reform the supercooled solution.

30. A method according to claim 28 wherein the fluid is crude oil with or without gas and/or water.

* * * * *